March 8, 1960 P. G. HANSEL 2,928,046
DIRECT READING FREQUENCY METER
Filed April 3, 1956 3 Sheets-Sheet 1

INVENTOR
PAUL G. HANSEL
BY
ATTORNEYS

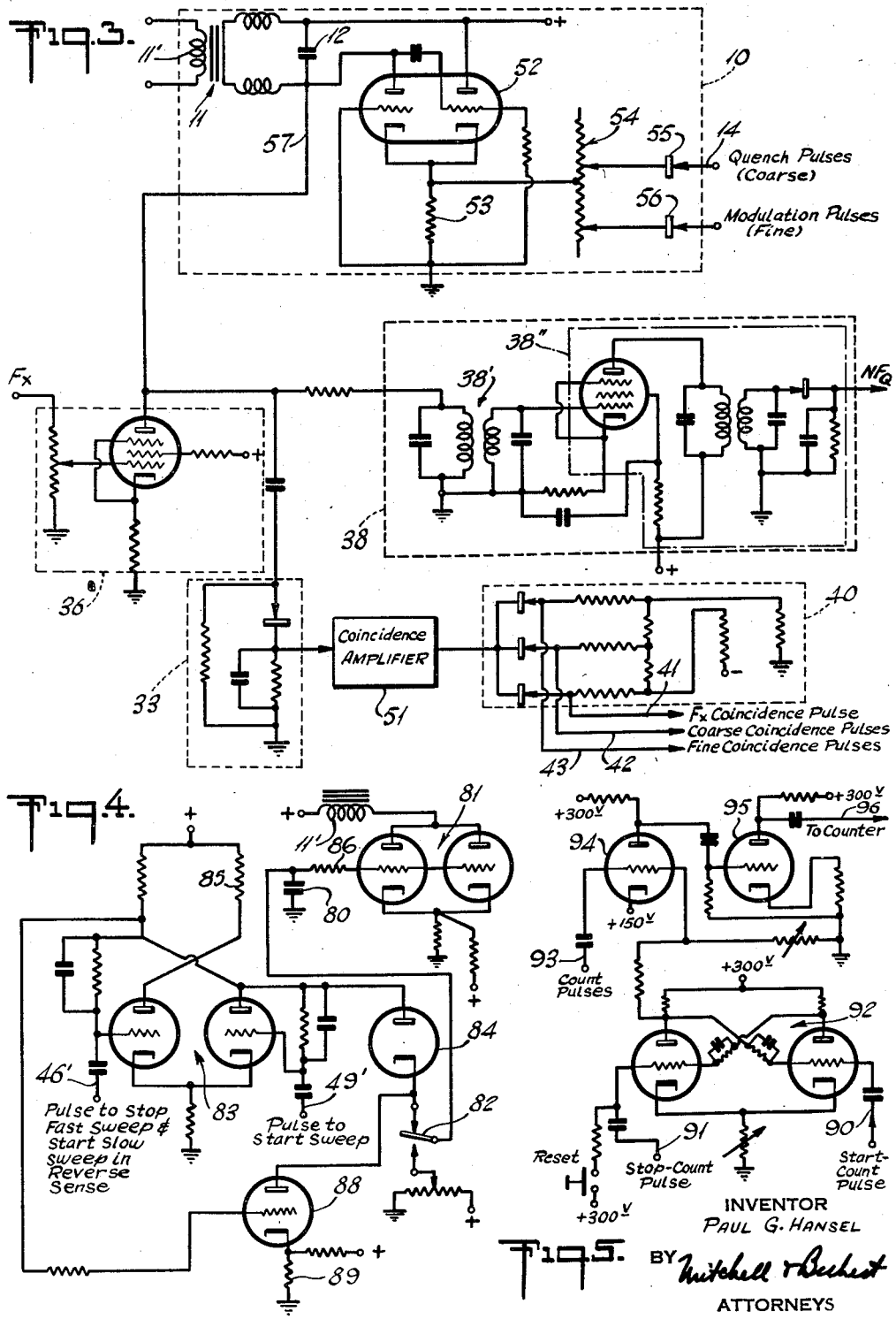

March 8, 1960 P. G. HANSEL 2,928,046
DIRECT READING FREQUENCY METER
Filed April 3, 1956 3 Sheets-Sheet 3
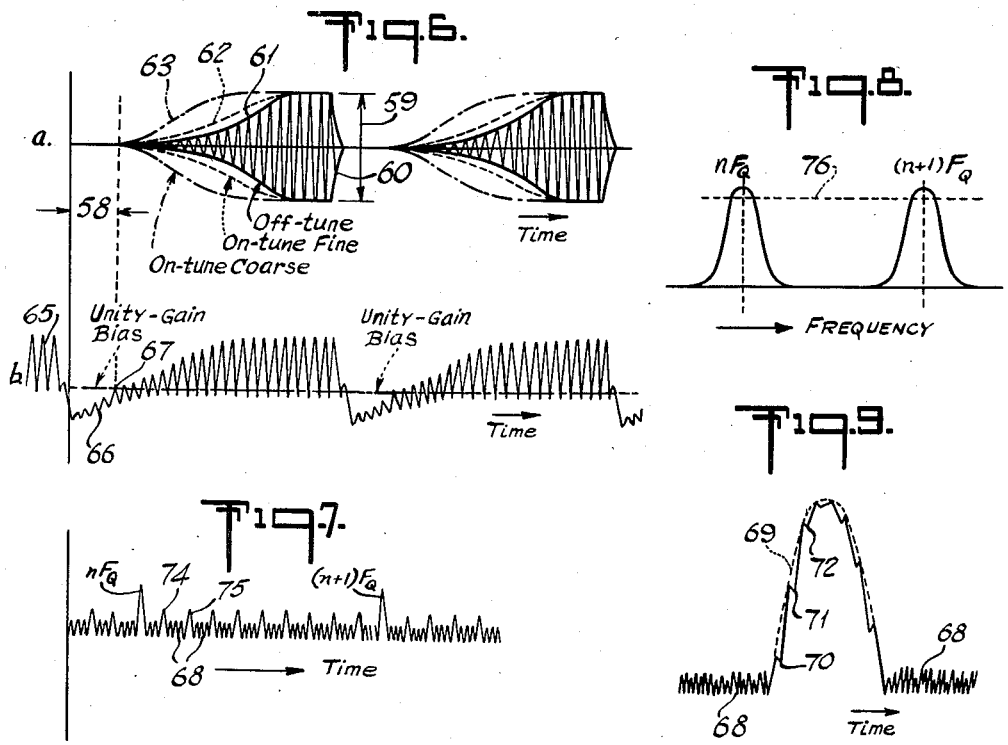
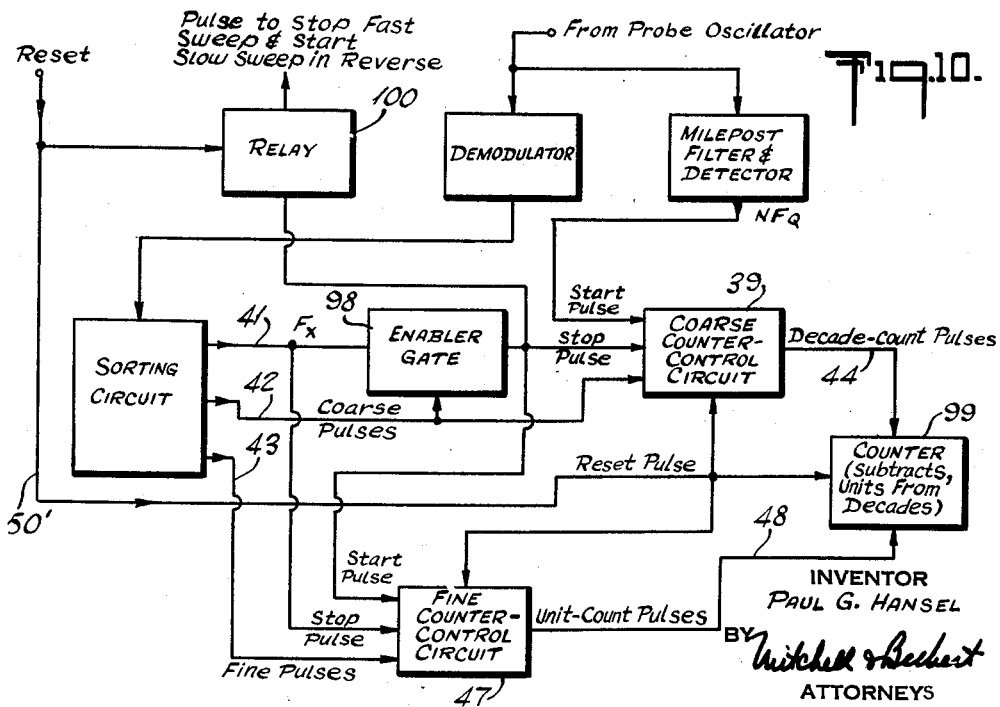
INVENTOR
PAUL G. HANSEL
BY Mitchell & Bechert
ATTORNEYS

United States Patent Office 2,928,046
Patented Mar. 8, 1960

2,928,046

DIRECT READING FREQUENCY METER

Paul G. Hansel, Greenvale, N.Y., assignor to Servo Corporation of America, New Hyde Park, N.Y., a corporation of New York Application April 3, 1956, Serial No. 575,780

12 Claims. (Cl. 324—79)

My invention relates to an improved frequency measuring or metering device applicable to the direct indicating of measured frequencies or frequency spreads. This invention incorporates improvements over the inventions disclosed in my copending applications Serial No. 200,060, filed December 9, 1950, now Patent 2,749,515; Serial No. 283,922, filed April 23, 1952, now Patent 2,749,442; and Serial No. 330,295, filed January 8, 1953, now Patent 2,807,781.

In frequency meters of the type disclosed in said application Serial No. 200,060, a spectrum of harmonics of a basic known crystal frequency was continuously swept by a variably tuned circuit, and coincidence-circuit means developed a count pulse for each harmonic thus scanned, in the gated interval between a reference harmonic and a signal of unknown frequency. In said application Serial No. 200,060, separate and distinct circuit elements were shown and described for performing the functions of spectrum expansion, mile-post generation, spectrum probing, coincidence detection, and amplification of the unknown frequency. Furthermore, the reference spectrum was characterized solely by harmonics of the basic crystal or reference frequency; said harmonics defined subdivisions of substantially the same amplitude throughout the spectrum of interest, so that in probing the spectrum to develop a count between the known and unknown frequencies, it was necessary to proceed relatively slowly in order to respond to (and, therefore, assuredly count) each subdivision.

It is an object of the invention to provide an improved device of the character indicated.

It is another object to provide an improved frequency meter wherein an accurate frequency count may be obtained in substantially less time than that heretofore required.

It is a further object to provide an improved frequency meter in which substantial circuit simplification may be achieved.

It is a specific object to provide an improved frequency meter in which the functions of spectrum generation, spectrum probing, and mixing to develop coincidence pulses may all be achieved in a single circuit.

It is another specific object to provide an improved frequency meter in which spectrum generation may be selectively limited only to the region being probed, the individual divisions of the selectively generated spectrum being always precisely referenced to a known basic frequency, regardless of the instantaneous location (or tuned frequency) of the probe within the spectrum being scanned.

It is still another specific object to provide an improved frequency meter featuring coarse and fine division and subdivision of the spectrum being scanned, and including provision for fast counting of the major or coarse divisions, while limiting subdivision counting only between unknown frequency and the last-counted major division.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Figure 1:
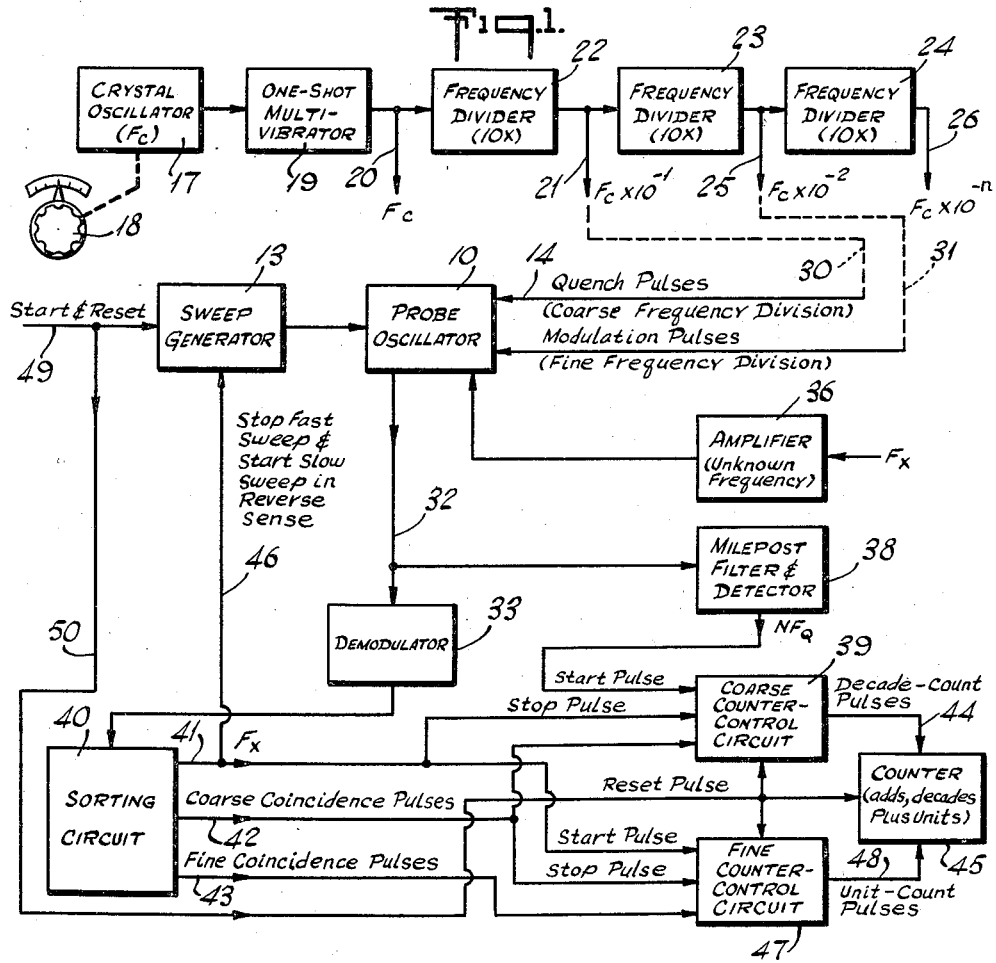
Fig. 1 is an electrical block diagram illustrating major components of a frequency meter incorporating features of the invention.

Figs. 3, 4, and 5 are electrical circuit diagrams of several components of the meter of Fig. 1;

Figs. 6, 7, 8, and 9 are graphical representations of electrical performance at various locations in the meter of Fig. 1; and Fig. 10 is a fragmentary block diagram representing an alternate organization for certain parts of the meter of Fig. 1.

Briefly stated, my invention contemplates an improved frequency meter featuring the combining into a single circuit of the functions of spectrum generation, spectrum probing, and mixing to develop coincidence pulses. This circuit also features selective development of the spectrum only in the region of interest, represented by the instantaneously probed, limited part of the total spectrum being scanned. This improved circuit is particularly adaptable to and is described in connection with means for selectively developing, throughout the spectrum, major frequency components representing major or coarse divisions referenced to a known frequency and useful for developing a coarse count, such as a decade count; at the same time, the circuit provides means whereby subdivisions of these major divisions may also be developed in the spectrum and may also be referenced to the same known frequency, so as to provide ascertainable fine-count divisions between the major divisions in the spectrum.

To complete the meter, I provide means whereby, in a first independent operation, coarse coincidence pulses (which reflect the probing of major frequency divisions) may be automatically counted between a known frequency and one of the major divisions nearest the unknown frequency. In a second independent operation, further means are automatically enabled and called into play to count the subdivision or fine-coincidence pulses. The combined coarse and fine-pulse counts yield the desired frequency determination.

In one general form to be described, the coarse count extends only to the last major or coarse-count coincidence pulse between the known and unknown frequencies and nearest the unknown frequency, in which case the fine count is added to the coarse count. In the other general form to be described, the coarse count extends to the first major or coarse coincidence pulse after the probe has swept past the unknown frequency, in which case the fine count is subtracted from the coarse count.

In said copending applications, and in my further applications, Serial Nos. 238,257, filed July 24, 1951, and 322,301, filed November 24, 1952, I explain that frequency metering of the character described has broader implications than the mere determination of an unknown frequency. For example, such a meter may be employed as a secondary-standard frequency source, in which case a signal of desired frequency may be synthesized or generated, by designating a desired harmonic and by probing the harmonic spectrum until the count corresponding to such harmonic is reached; secondary-standard precision is realized because the synthesized signal is based on a reference frequency which may be crystal-controlled and therefore well ascertained. The device has further application in the automatic selective control of transmission frequency where communication channels are closely packed and wherein carrier frequency is to be periodically shifted and precisely held, as when called for by military tactics. Whatever the application, it will be understood that reference to a frequency meter or to frequency measuring in the present application is not to be construed as limited merely to frequency metering and that the device is equally applicable in other situations, such as those just mentioned.

Referring to Fig. 1 of the drawings, my invention is shown in application to a frequency meter in which functions of selective spectrum generation, continuous spectrum probing, and mixing to develop coincidence pulses are all combined in what I term a probe oscillator 10. For purposes of continuously sweeping the spectrum of interest, the oscillator 10 includes a tuned circuit comprising a saturable reactor 11 and capacitance 12 (see Fig. 3), variably tuned by the output of a sweep generator 13, the circuit for which is shown in detail in Fig. 4. Frequency divisions within the spectrum of interest are developed by the probe oscillator 10 in response to regularly recurrent quenching, as by the application of quench pulses via an input connection 14.

Figure 2:
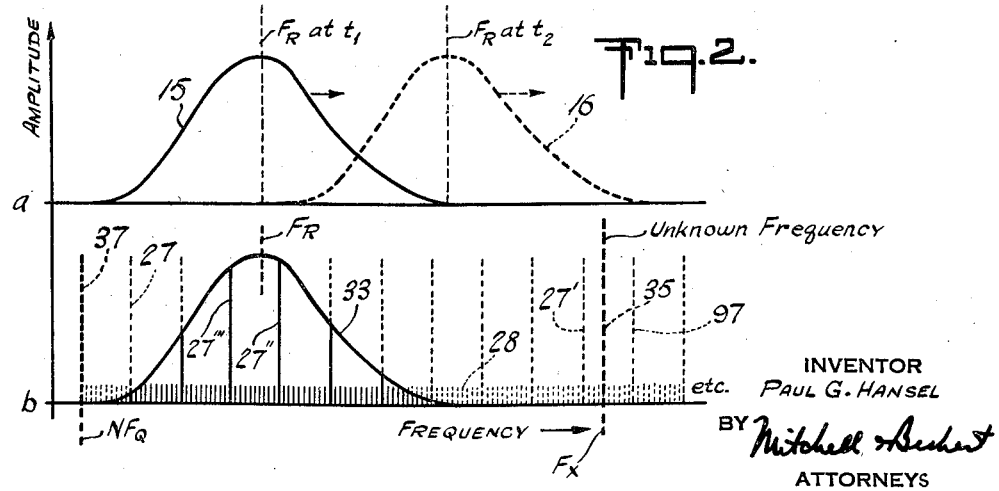
Fig. 2 is a graphical diagram depicting performance of certain parts of the meter of Fig. 1.

In the absence of quench pulses at 14, the instantaneous response of the probe oscillator 10 may be viewed as having an envelope 15 (see Fig. 2a), spanning a peak frequency $F_R$. The response 15 is shown in solid outline for the tuned condition at time $t_1$ and is shown in dashed outline 16 for conditions existing at some other time $t_2$, all in the course of a single probing or sweeping of the spectrum of interest. The smooth progression of the response 15 through the positions indicated in Fig. 2a will be understood to be under the control of sweep generator 13.

As explained above, spectrum generation within the probe oscillator 10 is developed by application of quench pulses at 14. The degree of quenching should be such as to prevent natural oscillation at the instantaneously tuned frequency $F_R$ of oscillator 10, unless such tuned frequency $F_R$ happens to coincide with one of the harmonics of the quench-pulse repetition rate; stated in other words, quench action should be sufficiently strong to develop only frequency components that are harmonics of the quench-pulse repetition rate.

The quench pulses and harmonics resulting therefrom may all be accurately ascertained by deriving quench pulses from a crystal controlled generator. In Fig. 1, such generator is shown to include a crystal oscillator 17, developing a known basic crystal-controlled frequency output $F_c$; if desired, the oscillator 17 may include manual adjustment means 18 for known or ascertainable selective control of the reference frequency $F_c$. A multivibrator 19 develops pulses recurring at the basic crystal frequency $F_c$, so that pulses of this frequency may be available at 20, if desired, for use in quenching the oscillator 10. If quench pulses at a lower recurrent rate are desired, the quench-pulse connection 14 may be made to the output 21 of a first frequency divider 22, operating from the multivibrator 19. Further frequency division may be achieved at 23 and at 24, the divided frequency being in each case designated at outputs 25—26 as a decade subdivision of the basic crystal frequency $F_c$. Thus, assuming the basic crystal frequency $F_c$ to be one megacycle per second, then the output at 21 will be 100 kc./s., the output at 25 will be 10 kc./s., and the output at 26 will be a still further decade subdivision ($10^{-n}$) of the crystal frequency $F_c$.

In Fig. 2b, I illustrate by the elongated dash lines 27, a plurality of successive harmonics of the quench-pulse repetition rate, said harmonics being developed as an inherent product of the quenching process occurring within the oscillator 10. The frequency intervals determined by adjacent successive harmonics 27 are employed for coarse frequency-division counting in accordance with the invention, as will be more fully explained below. To improve the resolution of my device, I provide additionally for developing, within the frequency spectrum to be probed, a set of subdivision components to be used in counting fine graduations or subdivisions within the major intervals of the coarse frequency divisions 27. These subdivision components are shown at 28 in Fig. 2b as being of substantially uniform but lesser amplitude than the major divisions 27 so as to facilitate count sorting, for coarse and fine-count purposes.

The subdivision components 28 may be developed as cross-modulation products of quench-pulse harmonics, using a lower subdivision output from the described basic pulse generator; for the form shown, dotted line 30 suggests derivation of quench pulses from the output connection 21, and the dashed line 31 suggests derivation of modulation pulses (fine frequency division) from the output 25. Within the oscillator 10, the quench pulses and the modulation pulses are mixed with relative amplitudes such that, for each harmonic of the quench frequency ($F_Q = F_c \times 10^{-1}$), sidebands 28 representing cross-modulation products of each quench-frequency harmonic ($nF_c \times 10^{-1}$) with the modulation frequency ($F_c \times 10^{-2}$) appear with substantially lesser amplitude, as shown in Fig. 2b. Since both the quench pulses and their harmonics, as well as the cross-modulation products 28, are all referenced to the same crystal frequency $F_c$, there need never be ambiguity as to the identity of a particular harmonic 27 with reference to the known crystal frequency $F_c$, or of any particular cross-modulation product 28 with reference to an adjacent harmonic 27.

The inherent function of the oscillator 10, when excited by quench and modulation pulses, as explained above, is to develop a signal in the outlet line 32 represented at any one instant of time by the solid vertical lines shown within the response envelope 33 of Fig. 2b. As the spectrum is probed, meaning that the envelope 33 progresses throughout the scanned spectrum, different harmonic lines 27 appear in the output 32, with amplitudes reflecting the relative amplitudes of quench and modulation pulses supplied to the oscillator 10. At any one instant of time, only a single pulse will appear in the output line 32, should there be coincidence of the instantaneously tuned frequency $F_R$ of the circuit 11—12 with one of the harmonics or modulation products derived from input signals to the probe oscillator. For the most part, signals in the output line 32 will be of one of two amplitudes and are a function of time during any particular sweep of the spectrum; for the decade-subdivided situation assumed in the present case, the signals in line 32 will be characterized by pulsed wave trains of major amplitude representing coincidence with successive harmonics of the quench-pulse repetition rate, spaced by nine pulses of lesser amplitude representing cross-modulation products with each such harmonic.

In accordance with the invention, use is made of the unknown frequency $F_x$ and of some known readily ascertainable frequency $NF_Q$ to determine limits within which coincidence pulses in the scanned spectrum are to be counted. To develop a major coincidence pulse 35 for the unknown frequency $F_x$, I show the supply of a signal characterized by the unknown frequency $F_x$ to an amplifier 36, for direct application to the probe oscillator 10. Signals in the output line 32 will thus be additionally characterized by a coincidence pulse 35 of major amplitude when the probe oscillator frequency $F_R$ is tuned through the unknown frequency $F_x$.

In the form shown, another pulse 37 of major amplitude is developed, by a circuit 38, to identify the known or reference frequency $NF_Q$ on which a specific count is to be based. It will be understood that the designation $NF_Q$ refers to a particular selected harmonic of the quench-pulse repetition rate. The output of the circuit 38 is a pulse so referenced to the operation of the sweep generator 13 as to permit timely opening of a gate constituting a coarse counter-control circuit 39; I have applied the legend "Start Pulse" at one input to the circuit 39 in order to suggest the function of the pulse derived from circuit 38.

The pulses in line 32 may be detected or demodulated at 33 and applied to an amplitude-discriminating sorting circuit 40 having several outputs 41—42—43, from which a pulse corresponding to the unknown frequency $F_x$, and pulses representing coarse coincidence and fine coincidence, are respectively available. In the form shown, the pulse representing coincidence with the unknown frequency $F_x$ is employed as a stop pulse, to close the gate within the coarse counter-control circuit 39.

Thus, the gate of circuit 39 is opened as the oscillator tunes through the reference frequency $NF_Q$ and is closed as the oscillator 10 tunes through the unknown frequency $F_x$. As long as the gate of circuit 39 is open, it functions to pass coarse-coincidence pulses from the line 42 to an output line 44 for direct application of what I term "Decade-Count Pulses" to a counter 45. For the continuous sweep of generator 13 in the direction to cause oscillator 10 to scan from the reference frequency $NF_Q$ to the unknown frequency $F_x$, the counter 45 will have responded to coarse-coincidence pulses 27 occurring in the frequency interval between these limits; in the situation depicted in Fig. 2, the gate of circuit 39 passes ten such coarse or decade-count pulses, for any single sweep of the spectrum.

Having counted only the coarse divisions between the limits $NF_Q$ and $F_x$, it remains to identify the fine divisions between the unknown frequency $F_x$ and the last-counted coarse-coincidence pulse 27', representing the nearest harmonic $(N+10)F_Q$. In the form shown, this is achieved by using the coincidence pulse produced by the unknown frequency $F_x$ to effect a reversal in the direction of sweep action in the generator 13; in Fig. 1, line 46 suggests the necessary control connection between sorting output 41 and the generator 13. Thus, probing past coincidence with the unknown frequency $F_x$ will have the effect of reversing the scanning direction of oscillator 10 within the spectrum; preferably, sweep reversal is also accompanied by a change in sweep rate, involving substantially slower scanning action, so that fine-coincidence pulses may be more readily resolved.

The fine-coincidence pulses appear in line 43 for each coincidence of the instantaneous oscillator frequency $F_R$ with a sideband component 28, and the succession of fine-coincidence pulses will terminate with a pulse of greater amplitude when said frequency $F_R$ coincides with the last-counted harmonic 27', i.e. $(N+10)F_Q$ in the example of Fig. 2b. In order to count this finer-resolved information, I employ a separate counter-control circuit 47, which may be a gate opened by a start pulse derived from the sorting output 41, and therefore characterized by coincidence with the unknown frequency F. As long as the gate of circuit 47 is open, fine-coincidence pulses 43 pass to an output 48 for direct application to the counter 45. The gate of circuit 47 is closed by a stop pulse which will be the first coarse-coincidence pulse received, namely, the harmonic 27', i.e. $(N+10)F_Q$ in the present example. The counter 45 will be understood to add the decade count, derived from pulses admitted through the coarse gate circuit 39, to the unit count, derived from the pulses admitted through the fine gate circuit 47, thus completing the counting functions of the meter.

Ordinarily, a single cycle of operation of my frequency meter will suffice to determine a desired frequency count for any given unknown frequency $F_x$.

If desired, the device may be made automatically recycling, but in the form shown, I merely suggest manual starting and reset functions. For this purpose, a pulse reflecting a manual start operation may be applied at 49 to the sweep generator 13 so as to initiate a probe scan by oscillator 10. Preferably, the tuned frequency $F_R$ at which probing commences is a frequency less than the reference frequency $NF_Q$; stated in other words, the probe oscillator 10 should be permitted to sweep past the reference frequency $NF_Q$. In addition to initiating sweep action at 13, the manually derived start pulse may perform a reset function, as suggested by connection 50 to both counter-control circuits 39—47 and to the counter 45.

The important component circuits, which have been generally referred to in the discussion thus far, are separately shown in Figs. 3, 4 and 5. Fig. 3 represents the probe oscillator 10, the amplifier 36 of the signal of unknown frequency $F_x$, the mile-post filter 38 and source of reference frequency $NF_Q$, the demodulator 33, and the sorting circuit 40. An amplifier 51 connects the demodulator 33 to the sorting circuit 40 for purposes of maintaining a desired range of signal level at the sorting circuit 40.

The probe oscillator 10 is seen to comprise essentially a frequency-determining tuned circuit 11—12, the tuned frequency $F_R$ of which is a direct function of the sweep-signal amplitude applied to the input winding 11' from the sweep generator 13. The oscillator 10 of Fig. 3 includes a two-stage highly regenerative amplifier 52, and quenching action is periodically achieved across a cathode resistor 53. The absolute and relative amplitudes of quench pulses and modulation pulses supplied to the oscillator 10 are selectable across input resistor means 54, and rectifiers 55—56 serve to isolate the respective sources 21—25 of quench and modulation pulses. The unknown frequency $F_x$ is continuously supplied to the oscillator 10, as by connection 57.

The action within oscillator 10 may perhaps be better understood by reference to Figs. 6 to 9. Fig. 6a depicts the various types of operation of oscillator 10 for successive quench pulses and for different situations of coincidence or lack of coincidence between the instantaneously tuned frequency $F_R$ and one of the harmonics 27 or sidebands 28 (see Fig. 2b); the time origin is assumed at the instant of complete extinction or quenching. For the effective period of quench, there is a quiescent interval 58 after which the regenerative nature of amplifier 52 builds-up or expands the envelope of oscillations to a saturation level 59; the quench portion of the envelope is designated 60, and the cycle repeats for each quench-pulse action.

In Fig. 6a, the envelope 61 shown in solid outline represents a typical response or oscillation build-up within the oscillator 10 for the off-tune condition, meaning that at the particular instant of time at which quench occurred, the tuned frequency $F_R$ of the oscillator did not coincide with any of the frequencies to be observed, that is, it did not coincide with the unknown frequency $F_x$ or with one of the quench harmonic frequencies 27 or with one of the sideband frequencies 28. Depending upon the quench-pulse repetition rate, a longer or shorter duration will be determined for operation at saturation until the next quench action takes place; for greatest sensitivity, the operation at saturation should be adjusted to a minimum fraction of the quench-repetition period for the off-tune condition.

For such quench pulses as do occur at a time when the tuned oscillator frequency $F_R$ coincides with a sideband frequency 28, the envelope or oscillation build-up following a quench will be slightly fatter, as suggested by the dashed contour 62. For such quench pulses as coincide in time with the tuning of the oscillator frequency $F_R$ to one of the harmonics 27 of the quench repetition rate, and because of the increased relative amplitude of these harmonics 27 with respect to the sidebands 28, an even faster build-up of oscillations will be achieved; in Fig. 6a, this is suggested by the dash-dot envelope 63. Still further, when certain quench pulses coincide in time with the tuning of the oscillator 10 to the unknown frequency $F_x$, the still greater amplitude of the unknown frequency signal will cause an even faster build-up of oscillation, following any particular quench action; in Fig. 6a, no envelope for such faster build-up is shown.

The function of the demodulator 33 is to integrate areas under successive envelope curves 61—62—63, as the case may be, with the result that the demodulator output is a succession of pulses of amplitude representing on-tune conditions of coincidence with one or the other of the various input-signal frequencies or frequency components.

Fig. 6b depicts control-grid voltage (as a function of time) in oscillator 10, under the circumstances described above in connection with Fig. 6a. Just before quenching, grid-voltage excursions 65 will represent saturated conditions and, upon application of the quench pulse, grid voltage will be temporarily driven below that representing unity-gain bias, thus cutting off output in line 32. The individual excursions of these oscillations will always be a complex of frequency components (quench-pulse harmonic frequencies currently within the envelope 33 of Fig. 2b), the most predominant of said harmonics being the one nearest the instantaneously tuned frequency $F_R$ of the oscillator 10; it is of no particular significance what this harmonic frequency is, except that it shall be a harmonic of the quench repetition rate.

During any cycle of probing the spectrum (i.e. throughout a sweep of generator 13), the predominant frequency of oscillations 65 within the envelopes 61—62—63 will shift by incremental harmonic intervals of the quench-pulse repetition rate; as indicated above, this predominant frequency component and other frequency components will reflect the frequency of that harmonic which is nearest the instantaneously tuned oscillator frequency $F_R$, along with nearby harmonics within the response envelope 33. In the situation depicted in Fig. 2b, the nearest (and, therefore, most predominant) such harmonic frequency is designated 27″, and the next most predominant harmonic is the next lower harmonic 27‴ of the quench-pulse repetition rate. So strong are these components that, in spite of quenching, they remain present in the grid voltage depicted in Fig. 6b, thus accounting for undulations 66 as the oscillator is attempting to recover from a particular quench action. During the period of recovery, the individual amplitudes of successive excursions 66 grow until the unity-gain bias threshold is first crossed; this is shown to occur for the excursion 67. After crossing the level of unity-gain bias, an output signal appears in line 32, as discussed in connection with Fig. 6a, and subsequent build-up of the output signal is as discussed in Fig. 6a.

It is particularly important to note in connection with the discussion of Figs. 6a and 6b that the quench period is precisely determined as a strict function of the quench-pulse repetition rate, regardless of what harmonic of the quench-pulse repetition rate instantaneously predominates in the complex of oscillating excursions. This assures that oscillator output will always commence in the same phase relation for each successive quench action, thus assuring fidelity of adherence to harmonics of the quench-pulse repetition rate, as distinguished from the instantaneous tuned frequency $F_R$ of the oscillator.

To an observer watching the development of an output count at 45, the spectrum-scanning rate may seem quite rapid, yet this spectrum-scanning rate is preferably slow compared to the quench-pulse repetition rate. This means that as the oscillator is tuned through the conditions representing coincidence with any particular input frequency component (viz.: the unknown frequency $F_x$; harmonics of the quench-pulse repetition rate; sidebands of harmonics of the quench-pulse repetition rate) a number of successive quenching actions will have occurred. This fact is perhaps best illustrated in Fig. 9, wherein the excursions 68 represent "grass" or random noise in the output of the detector 33, and wherein response within the dashed outline 69 represents progressive build-up of oscillator response as it is tuned through coincidence with one of the various frequencies available for coincidence. In Fig. 9, the individual steps 70—71—72 inside the envelope 69 represent transient decay (at the time constant of demodulator 33) on each of several successive quenches as the oscillator probes through a particular coincidence frequency.

Fig. 7 illustrates the envelope (detected video) of signals present in the oscillator output as it is caused to scan the spectrum. The legends $nF_Q$ and $(n+1)F_Q$ identify adjacent harmonics of the quench-pulse repetition rate, each of which may have been developed in accordance with the discussion of Fig. 9. The lesser pulses 74—75 appearing between these major pulses may be of the same general form as discussed in connection with Fig. 9, but due to the fact that they represent coincidence with the sideband frequencies of lesser amplitude, the pulses 74—75 are of lesser amplitude. In between the described pulses appears the noise or "grass" 68.

Fig. 8 illustrates a criterion determining the desired level of quench-pulse input for optimizing the resolution of my oscillator. Preferably, the quench pulse should be of such amplitude that the harmonics thereof which are used in any particular sweep or probing of the spectrum shall be of amplitude just exceeding noise level, designated 76 in Fig. 8. Under these circumstances, the largest possible number of cross-modulation products (sidebands) may be caused to appear and to be clearly resolved between adjacent harmonics of the quench-pulse repetition rate.

To complete the description of the basic circuit of Fig. 1, reference is made to Figs. 4 and 5 showing, respectively, the sweep circuit 13 and a typical one of the counter-control circuits 39 or 47. The sweep circuit of Fig. 4 is seen to develop a sweep voltage by progressively charging or discharging a capacitor 80, and the output amplifier 81 follows the charge level on capacitor 80 for application of the sweep voltage to the control winding 11′ of the oscillator 10. With the switch 82 in the position shown, and upon application of a start pulse at 49′, the right-hand half of a flip-flop circuit 83 is rendered conductive, thus cutting off the left half thereof and allowing plate voltage of the left half to rise; connection 49′ will be understood to be the connection supplied by line 49, as described in connection with Fig. 1. Diode 84 assures that during the flip-flop cycle determined by application of the start pulse at 49′, the sweep voltage will be delivered to charge capacitor 80, at a relatively fast rate determined by the time constant of elements 80—85—86; but when the flip-flop circuit is reversed, no charge can leak off capacitor 80 by way of the flip-flop circuit. Once a coincidence with the unknown frequency $F_x$ develops, the stop pulse is available in line 46 for application to the stop-and-reverse connection 46′ of the sweep circuit. This reverses the flip-flop action, and renders tube 88 conductive, so as to interpose an additional resistor 89 in a path for more slow leakage (to ground) of the charge on capacitor 80, thus determining a slow decay and, therefore, a relatively slow-action reversed sweep of the oscillator 10.

Fig. 5 shows a typical counter-control circuit, which may be one of the circuits 39—47, having separate connections at 90—91 to accommodate start-count and stop-count pulses, these pulses being applied to opposite control ends of a flip-flop circuit 92 that is used to determine gate action. The gate comprises a two-stage amplifier 94—95 biased by flip-flop circuit 92 to pass count pulses from an input 93 to an output 96 whenever the gate is open. The input 93 will be understood to continuously receive coarse-count (decade) pulses from line 42 for the case of circuit 39, and fine-count (unit) pulses from line 43 for the case of circuit 47.

To derive the reference frequency $NF_Q$ for any particular operation of my meter, I have shown (Fig. 3) a passive network 38 merely connected to and therefore monitoring the output of the probe oscillator. In network 38, a pretuned input circuit 38′ may be adjusted for response to a known preselected harmonic of the quench-repetition rate so that, as the oscillator 10 tunes through this preselected harmonic, a pulse generator and detector 38'' may develop an output pulse to mark coincidence with the reference frequency $NF_Q$.

In Fig. 10, I show a slight modification of a portion of the circuit of Fig. 1 in order to achieve essentially the same results by slightly different means. It will be recalled that in the circuit of Fig. 1 a frequency count is determined by adding a fine count to a coarse count; in Fig. 10, the reverse is true, in that a fine count is subtracted from a coarse count. In Fig. 10, all harmonics 27 following the reference frequency $NF_Q$ are counted until that particular one (97) which follows coincidence with the unknown frequency $F_x$. This means that for the situation depicted in Fig. 2b, the circuit of Fig. 10 will develop in the output line 44, from the coarse counter-control circuit 39, eleven decade-count pulses, and that it will be necessary to count back (or subtract) from this decade count the number of units represented by coincidences with sideband or fine-frequency divisions, terminating at the unknown frequency $F_x$.

Thus, to open the gate of circuit 39, I employ the same reference-frequency pulse $NF_Q$, but to close the gate of circuit 39, I employ an enabler gate 98 responsive to the coincidence pulse developed when first traversing the unknown frequency $F_x$. The enabler gate 98 may be a flip-flop circuit, which is normally closed until opened by the pulse reflecting coincidence with the unknown frequency $F_x$. Once the gate 98 is opened, the next-occurring coarse-coincidence pulse (97, Fig. 2b) available from line 42 will be passed through gate 98 to apply a stop pulse to the terminal 91 (Fig. 5) of the coarse counter-control circuit 39. This same stop pulse will be fed by a relay 100 to the sweep circuit in order to reverse the sweep and determine a slower rate of reverse scanning, all as described above.

This same stop pulse, representing the next harmonic beyond the unknown frequency $F_x$, is further used to control an opening of the gate in the fine counter-control circuit 47, meaning that coarse-counting ceases and fine-counting commences. The fine-coincidence pulses are supplied continuously to the gate of circuit 47, and these will be passed in line 48 to the counter 99 as long as the gate of circuit 47 remains open (i.e. until harmonic 97 is counted). As the scanning slowly sweeps back from the harmonic 97 to the unknown frequency $F_x$, the fine count is fully developed, and the coincidence pulse reflecting tuning to the unknown frequency $F_x$ is applied to stop the fine count, by closing the gate of circuit 47. The counter 99 will be understood to differ from the counter 45 of Fig. 1, in that it automatically subtracts the unit count from the decade count, but the same accuracy of frequency determination is possible in both cases. Resetting is schematically designated by connections 50' similar to those described at 50.

It will be seen that I have described a substantially improved frequency-measuring device of the character indicated. My device can operate automatically and in much less time than previously required, and substantial circuit simplification is realized. A significant simplification is realized by only generating the harmonic-spectrum components in the current vicinity of the probe frequency $F_R$, thus avoiding development of the full spectrum at any one time, and yet not sacrificing any precision of reference to the basic frequency, which may be crystal-controlled. The principles of the invention are applicable not only for the metering embodiments shown and described, but also for selective frequency determination, generation, and control, as suggested above.

While I have described the invention in detail for the preferred methods and forms shown it will be understood that modifications may be made within the scope of the invention as defined in the claims which follow.

I claim:

1. In a frequency-measuring apparatus of the character indicated for measuring the frequency spread between a known frequency and an unknown frequency, spectrum generator means establishing a spectrum of frequencies spanning said known and unknown frequencies, said spectrum comprising known major divisions referenced to said known frequency and characterized by a first general amplitude level, said generator means including means for establishing within said spectrum and at lesser amplitude known frequency components representing further subdivisions of the major divisions of said spectrum, frequency-probing means connected to said generator means and including an input connection for supply by a source of the unknown frequency, said frequency-probing means also including a tuned circuit and means for continuously variably tuning the same over the range of said spectrum, whereby the output of said probing means as a function of time may include a plurality of coincidence pulses of a first amplitude representing major divisions of said spectrum and of a lesser amplitude representing subdivisions of said major divisions, first counting means connected to the output of said probing means and responsive only to pulses representing said major divisions beginning at said known frequency and extending to one of the major spectrum divisions nearest said unknown frequency, and second counting means connected to the output of said probing means responsive only to pulses of said lesser amplitude in the region between said unknown frequency and said nearest major division frequency.

2. In a frequency measuring apparatus of the character indicated for measuring the frequency spread between a known frequency and an unknown frequency, spectrum generator means establishing a spectrum of frequencies spanning said known and unknown frequencies, said spectrum comprising known major divisions referenced to said known frequency and characterized by a first general amplitude level, said generator means including means for establishing within said spectrum and at lesser amplitude known frequency components representing further subdivisions of the major divisions of said spectrum, frequency-probing means connected to said generator means and including an input connection for supply by a source of the unknown frequency, said frequency-probing means also including a tuned circuit and means for continuously variably tuning the same over the range of said spectrum, whereby the output of said probing means as a function of time may include a plurality of coincidence pulses of a first amplitude representing major divisions of said spectrum and of a lesser amplitude representing subdivisions of said major divisions, first counting means connected to the output of said probing means and responsive only to pulses representing said major divisions beginning at said known frequency and extending to that one of the major spectrum divisions which is intermediate said known and unknown frequencies and which is nearest said unknown frequency, and second counting means connected to the output of said probing means and responsive only to pulses of said lesser amplitude in the region between said unknown frequency and said nearest major division frequency.

3. In a frequency measuring apparatus of the character indicated for measuring the frequency spread between a known frequency and an unknown frequency, spectrum generator means establishing a spectrum of frequencies spanning said known and unknown frequencies, said spectrum comprising known major divisions referenced to said known frequency and characterized by a first general amplitude level, said generator means including means for establishing within said spectrum and at lesser amplitude known frequency components representing further subdivisions of the major divisions of said spectrum, frequency-probing means connected to said generator means and including an input connection for supply by a source of the unknown frequency, said frequency-probing means also including a tuned circuit and means for continuously variably tuning the same over the range of said spectrum, whereby the output of said probing means as a function of time may include a plurality of coincidence pulses of a first amplitude representing major divisions of said spectrum and of a lesser amplitude representing subdivisions of said major divisions, first counting means connected to the output of said probing means and responsive only to pulses representing said major divisions beginning at said known frequency and extending to that one of said major spectrum divisions which is first encountered after detecting coincidence with said unknown frequency, second counting means connected to the output of said probing means and responsive only to pulses of lesser amplitude in the region between said one major spectrum division and said unknown frequency, said first and second counting means including means subtracting the output of said second counting means from the output of said first counting means.

4. Frequency measuring apparatus for measuring the spread between a known frequency and an unknown frequency, comprising a spectrum generator developing a spectrum of frequencies referenced to the known frequency and containing major frequency divisions of relatively large amplitude and lesser amplitude subdivisions of said major divisions, a tunable circuit continuously tuned over said spectrum between said known and unknown frequencies, said tuned circuit including an input connection for supply by a source of the unknown frequency, counting means responsive to the major and minor subdivisions sensed by said tuned circuit as the same is tuned between said known and unknown frequencies, and a sweep circuit for automatically controlling the continuous tuning of said tuned circuit, said sweep circuit having a first and relatively fast sweep-rate while sweeping from said known frequency toward said unknown frequency and including means responsive to and sensing the major frequency divisions intermediate said known and unknown frequency, and means responsive to a tuned sensing of that major frequency division which is encountered just after passing said unknown frequency for thereupon reversing the sign and retarding the speed of sweep by said sweep generator, whereby on sweep reversal subdivision counts may be made between said unknown frequency and the said major division frequency nearest said unknown frequency.

5. Frequency measuring apparatus for measuring the spread between a known frequency and an unknown frequency, comprising a spectrum generator developing a spectrum of frequencies referenced to the known frequency and containing major frequency divisions of relatively large amplitude and lesser amplitude subdivisions of said major divisions, a tuned circuit continuously tunable over said spectrum between said known and unknown frequencies, said tuned circuit including an input connection for supply by a source of the unknown frequency, counting means responsive to the major and minor subdivisions sensed by said tuned circuit as the same is tuned between said known and unknown frequencies, and a sweep circuit for automatically controlling the continuous tuning of said tuned circuit, said sweep circuit having a first and relatively fast sweep rate while sweeping from said known frequency toward said unknown frequency and including means responsive to and sensing the major frequency divisions intermediate said known and unknown frequency, means responsive to a tuned sensing of said unknown frequency for reversing the sign and retarding the speed of sweep by said sweep generator, whereby on sweep reversal subdivision counts may be made between said unknown frequency and that counted major division frequency which is nearest said unknown frequency.

6. Probing means for a frequency measuring device of the character indicated, comprising an oscillator including a regenerative amplifier and a variably tunable circuit in controlling relation with said oscillator, means connected to said circuit for continuously tuning said circuit through a spectrum of frequencies, and quench means for said oscillator including a pulse generator quenching said amplifier at a regular recurrence rate and with sufficient strength to develop within the response band of said oscillator harmonics of the quench frequency having amplitudes at least equal to noise level in said amplifier.

7. Probing means for a frequency measuring device of the character indicated, comprising an oscillator including a regenerative amplifier and a variably tunable circuit in controlling relation with said oscillator, means connected to said circuit for continuously tuning said circuit through a spectrum of frequencies, and quench means for said oscillator including a pulse generator quenching said amplifier at a regular recurrence rate and with sufficient strength to develop within the response band of said oscillator harmonics of the quench frequency having amplitudes exceeding the noise level in said amplifier.

8. In a frequency-measuring apparatus of the character indicated for measuring the frequency spread between a known frequency and an unknown frequency, spectrum generator means establishing a spectrum of frequencies spanning said known and unknown frequencies, said spectrum comprising known major divisions referenced to said known frequency and characterized by a first general amplitude level, said generator means including means for establishing within said spectrum and at different amplitude known frequency components representing further subdivisions of the major divisions of said spectrum, frequency-probing means connected to said generator means and including an input connection for supply by a source of the unknown frequency, said frequency-probing means also including a tuned circuit and means for continuously variably tuning the same over the range of said spectrum, whereby the output of said probing means as a function of time may include a plurality of coincidence pulses of a first amplitude representing major divisions of said spectrum and of a different amplitude representing subdivisions of said major divisions, first counting means responsive only to pulses representing said major divisions beginning at said known frequency and extending to one of the major spectrum divisions nearest said unknown frequency, and second counting means responsive only to pulses of said different amplitude in the region between said unknown frequency and said nearest major division frequency.

9. Frequency measuring apparatus for measuring the spread between a known frequency and an unknown frequency, comprising a spectrum generator developing a spectrum of frequencies referenced to the known frequency and containing major frequency divisions of essentially one amplitude and different-amplitude subdivisions of said major divisions, a tuned circuit continuously tunable over said spectrum between said known and unknown frequencies, said tuned circuit including an input connection for supply by a source of the unknown frequency, counting means responsive to the major and minor subdivisions sensed by said tuned circuit as the same is tuned between said known and unknown frequencies, and a sweep circuit for automatically controlling the continuous tuning of said tuned circuit, said sweep circuit having a first and relatively fast sweep rate while sweeping from said known frequency toward said unknown frequency and including means responsive to and sensing the major frequency divisions intermediate said known and unknown frequency, and means responsive to tuned sensing of that major frequency division which is nearest said unknown frequency for reversing the sign and retarding the speed of sweep by said sweep generator, whereby on sweep reversal subdivision counts may be made between said unknown frequency and the said major division frequency nearest said unknown frequency.

10. Frequency measuring apparatus for measuring the spread between a known frequency and an unknown frequency, comprising a spectrum generator developing a spectrum of frequencies referenced to the known frequency and containing major frequency divisions of essentially one amplitude and different-amplitude subdivisions of said major divisions, a tuned circuit continuously tunable over said spectrum between said known and unknown frequencies, said tuned circuit including an input connection for supply by a source of the unknown frequency, counting means responsive to the major and minor subdivisions sensed by said tuned circuit as the same is tuned between said known and unknown frequencies, and a sweep circuit for automatically controlling the continuous tuning of said tuned circuit, said sweep circuit having a fast sweep rate and a slow sweep rate and means for selecting one to the exclusion of the other of said sweep rates, and means connected to said tuned circuit and responsive to tuned coincidence with said known and unknown frequencies and in controlling relation with said sweep circuit to determine said fast sweep rate, whereby major frequency divisions may be observed during said fast sweep, said last-defined means including means responsive to tuned coincidence with said unknown frequency and with one of the major frequency divisions immediately adjacent said unknown frequency and in controlling relation with said sweep circuit to determine said slow sweep rate, whereby minor frequency divisions may be observed between said unknown frequency and said adjacent major frequency division.

11. Frequency measuring apparatus for measuring the spread between a known frequency and an unknown frequency, comprising a spectrum generator developing a spectrum of frequencies encompassing said unknown frequency and referenced to the known frequency and delivering an output characterized by major frequency divisions of essentially a first amplitude and minor frequency subdivisions of essentially a second amplitude, a tunable circuit connected to said generator and continuously tunable over said spectrum between said known and unknown frequencies, a source of said unknown frequency connected to said tunable circuit and including means for controlling the signal amplitude of said unknown frequency to essentially a third amplitude, a first major-division counter responsive to count signals only of said first amplitude, a second subdivision counter responsive to count signals only of said second amplitude, a tuned circuit connected to said tunable circuit and tuned to said known frequency, whereby a known-frequency signal may be developed upon coincidence of the tunable-circuit frequency with said known frequency, and control means including means connected to said tuned and tunable circuits and also connected in selective controlling relation with said counters, said control means responding to an output of said tuned circuit and to a signal of said third amplitude to channel tunable-circuit output to said first counter and responding to a signal of said third amplitude and the next-succeeding signal of said first amplitude to channel tunable-circuit output to said second counter.

12. Frequency measuring apparatus for measuring the spread between a known frequency and an unknown frequency, comprising a spectrum generator developing a spectrum of frequencies encompassing said unknown frequency and referenced to the known frequency and delivering an output characterized by major frequency divisions of essentially a first amplitude and minor frequency subdivisions of essentially a second amplitude, a tunable circuit connected to said generator and continuously tunable over said spectrum between said known and unknown frequencies, a source of said unknown frequency connected to said tunable circuit and including means for controlling the signal amplitude of said unknown frequency to essentially a third amplitude, a first major-division counter responsive to count signals only of said first amplitude, a second subdivision counter responsive to count signals only of said second amplitude, a tuned circuit connected to said tunable circuit and tuned to said known frequency, whereby a known-frequency signal may be developed upon coincidence of the tunable-circuit frequency with said known frequency, and control means including means connected to said tuned and tunable circuits and also connected in selective controlling relation with said counters, said control means responding to a signal of said third amplitude and to the next-succeeding signal of said first amplitude to channel tunable-circuit output to said second counter and responding to said next-succeeding signal and to an output of said tuned circuit to channel tunable-circuit output to said first counter.

References Cited in the file of this patent
UNITED STATES PATENTS

| | | |
|---|---|---|
| 2,430,570 | Hulst | Nov. 11, 1947 |
| 2,455,052 | Fisher | Nov. 30, 1948 |
| 2,547,217 | Kraayeveld | Apr. 3, 1951 |
| 2,560,124 | Mofenson | July 10, 1951 |
| 2,617,034 | Hepp | Nov. 4, 1952 |
| 2,732,496 | Slonczewski | Jan. 24, 1956 |
| 2,745,061 | Minter | May 8, 1956 |
| 2,749,442 | Hansel | June 5, 1956 |
| 2,805,336 | Hupert | Sept. 3, 1957 |

OTHER REFERENCES

"An Ultra-High Frequency Measuring Assembly," article in Proceedings of the I.R.E., vol. 27, No. 3, March 1939, pp. 208–212.

"Frequency Measurement by Sliding Harmonics," article in Proceedings of the I.R.E., October 1948, pp. 1285–1288.